Figure 1:
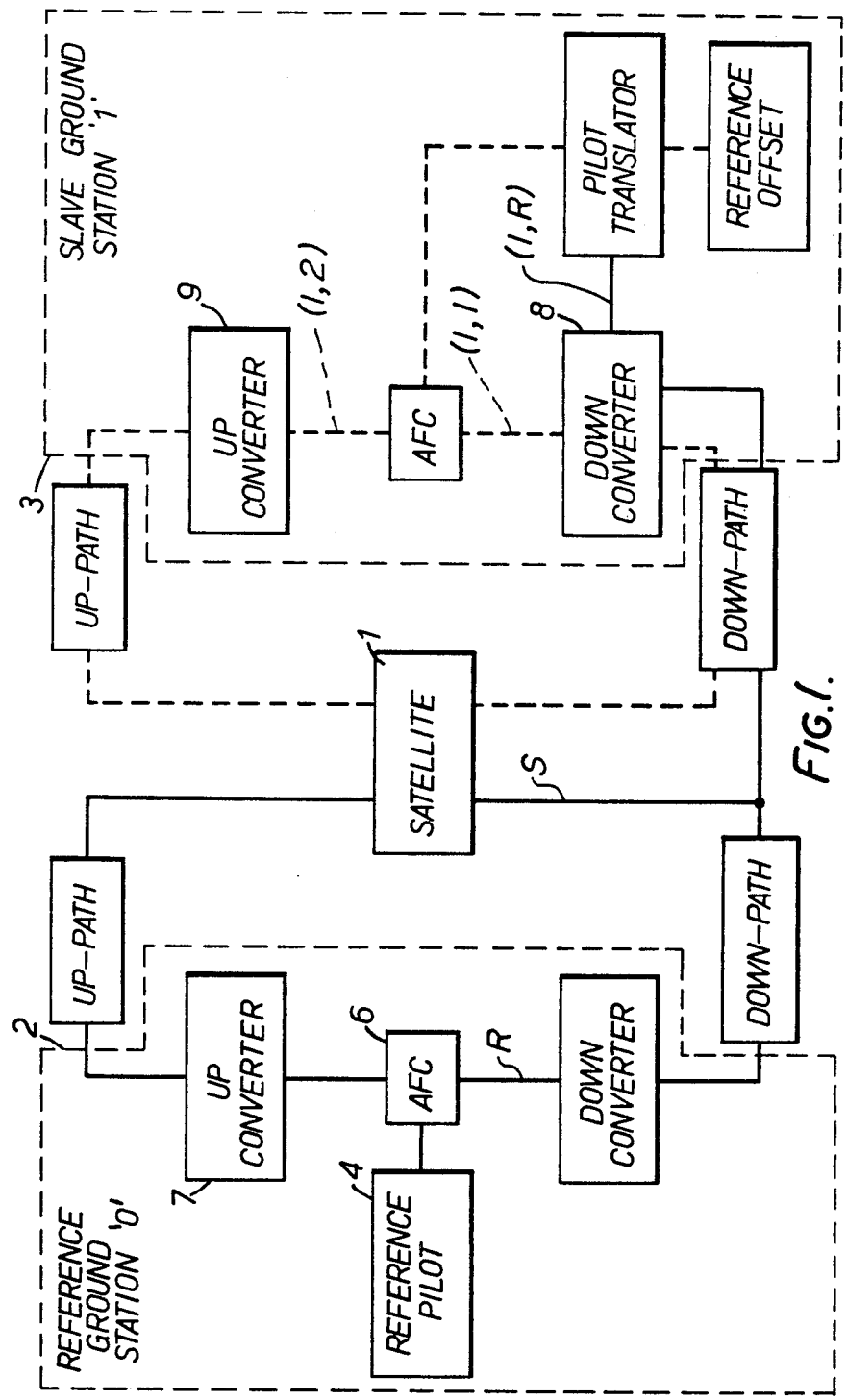

United States

Schelisch 4,191,923

Mar. 4, 1980

[54] SATELLITE COMMUNICATION SYSTEMS

[75] Inventor: Ernst F. Schelisch, Hatfield Peverel, England

[73] Assignee: The Marconi Company Limited, Chelmsford, England

[21] Appl. No.: 802,508

[22] Filed: Jun. 1, 1977

[30] Foreign Application Priority Data

Jul. 30, 1976 [GB] United Kingdom ............... 31897/76

[51] Int. Cl.² .................................................. H04B 7/14
[52] U.S. Cl. .................................................. 325/4
[58] Field of Search ........................... 325/4, 2, 9, 58; 179/15 BS, 15 BA; 178/69.1

[56] References Cited

U.S. PATENT DOCUMENTS

| 3,428,898 | 2/1969 | Jacobsen et al. | 325/4 |
| 3,450,842 | 6/1969 | Lipke | 325/4 |
| 3,942,115 | 3/1976 | Wolejsza | 325/4 |
| 3,982,075 | 9/1976 | Jefferis | 325/4 |
| 4,004,225 | 1/1977 | Gänssmanter | 179/15 BS |
| 4,010,420 | 3/1977 | Reiner et al. | 179/15 BS |
| 4,019,138 | 4/1977 | Watanabe | 325/58 |
| 4,028,497 | 6/1977 | Saburi | 325/4 |

Primary Examiner—Robert L. Griffin
Assistant Examiner—Michael A. Masinick
Attorney, Agent, or Firm—Diller, Ramik & Wight

[57] ABSTRACT

A satellite communications system is so arranged that different communications channels can be set up without interfering with each other. A reference pilot signal is set to enable errors and frequency shifts in the system to be measured, so that when a communications channel is set up due allowance can be made. This approach allows channels to be accurately placed more closely together.

7 Claims, 2 Drawing Figures

SATELLITE COMMUNICATION SYSTEMS

This invention relates to satellite communication systems in which a number of independent ground stations are able to communicate with each other. The communication may be by means of a frequency division multiple access (f.d.m.a.) system or by a time division multiple access (t.d.m.a.) system, and whichever system is used it is necessary for the signals sent by each ground station to be offset from a nominal value so that the signals have the nominal value at the satellite itself. The offset is required to compensate for delays and errors occuring in the system, and also to compensate for the Doppler effect. The relevance of the Doppler effect to satellite communication systems is now well known as it can produce significant frequency shifts in a frequency division multiple access system and time slot shifts in a time division multiple access system. Such effects are unacceptable, and previous systems have been proposed for compensation for the Doppler effect. It has previously been proposed to provide enough unused frequency space (in the case of a f.d.m.a. system), and wide enough guard times (in the case of a t.d.m.a. system) between the different communication channels going through the satellite so that the Doppler frequency and time shifts experienced by the various ground stations will not cause channel overlaps.

Systems with pilot frequencies or master synch signals sent by one master ground station have been proposed in which the remaining ground stations synchronise their transmissions with those of the master ground station, but this does not avoid the need to compensate for the effects of path length changes, and the rate of these changes (Doppler effect). The required frequency and time slot guard bands can account for a large portion of the spectrum, which is left unused for useful communication purposes. This is wasteful and limits the number of separate communication channels that can be handled by a satellite system.

The present invention seeks to provide an improved satellite communication system in which this disadvantage is reduced.

According to one aspect of this invention a satellite communications system includes two or more ground stations arranged to communicate via a satellite, one ground station including means for generating and transmitting a reference pilot signal which is received via the satellite by another ground station, means located at said other ground station for transmitting in a part of the communication band of the system not being used as a communication channel an auxiliary pilot signal which is received and returned by the satellite to enable Doppler shifts to be detected, and means for generating and transmitting in a designated communication channel reserved for pilots, a pilot signal compensated for the detected Doppler shift so that upon reception at the satellite the pilot signal is spaced apart from the reference pilot signal by a predetermined amount.

Although the invention is applicable to both f.d.m.a. systems and t.d.m.a. systems, it will be further described primarily with reference to just a f.d.m.a. system, the operation of a t.d.m.a. system being generally analogous.

According to a further aspect of this invention, a satellite communications system includes two or more ground stations arranged to communicate via a satellite, one ground station including means for generating and transmitting a reference pilot signal having a stable reference frequency which is received via the satellite by another ground station, means located at said other ground station for transmitting in a part of the communication band of the system not being used as a communication channel an auxiliary pilot frequency which is received and returned by the satellite to enable the Doppler frequency shifts to be detected, and means for generating and transmitting in a designated communication channel reserved for pilots, a pilot frequency compensated for the detected Doppler frequency shift so that upon reception at the satellite the pilot frequency is spaced apart from the reference frequency by a predetermined amount.

The ground stations, apart from the ground station which transmits the reference pilot, do not transmit carriers modulated by traffic signals in any communications channel until the effect of Doppler shifts has been measured and allowed for, preferably, any frequency translation errors in the loop between that ground station and the satellite are also measured, so that when the pilot signal is actually transmitted in a communication channel it is accurately positioned so as not to interfere with adjacent communication channels. As the positions of the pilot signals are thus accurately preset in relation to the reference pilot signal, each communication channel can be relatively narrow, allowing many more communication channels to be accommodated within the communication band of the system. It is, of course, possible that the transmitted pilot signal will not be precisely correct, and fine tuning can be employed to achieve the final degree of accuracy required. However, the degree of fine tuning needed will be relatively very small, so that there is no risk of one pilot signal being tuned across (and thereby interferring with) the pilot signal from another ground station operating in the adjacent pilot slot.

In general terms the principle of the invention may be explained with reference to a f.d.m.a. system as follows. One designated master ground station with a very accurate and stable frequency generator transmits a reference pilot signal which is continuously received (via the satellite) by the other ground stations. A station wishing to start signal transmissions sends out an unmodulated carrier signal in either a reserved part of the communications frequency band or a temporarily unused part of the communications frequency band, and measures the frequency of the signal returned by the satellite. By this means the magnitude of the Doppler effect and errors inherent in the signal loop between the station and the satellite can be measured. These errors include the frequency translation error in the satellite and the delay variation in the satellite. The transmission frequency is then shifted to such a value that the return signal obtained from the satellite has a predetermined frequency spacing from the reference frequency received from the master ground station. When the new transmission frequency has been obtained and locked onto the reference frequency the transmission of the unmodulated carrier is discontinued. In practice many such ground stations would use this procedure to generate their own pilot signal so that a set of pilot frequencies are received by the satellite, each being spaced apart from the master reference pilot signal by different predetermined amounts.

By this means the frequency bands allocated to the different ground station can be very close together since there is now no need to provide wide guard bands to prevent channel overlap due to uncertainty in the value of the frequency of a pilot signal.

The foregoing is concerned with a f.d.m.a. system, but analogous considerations apply to t.d.m.a. systems.

Figure 2:
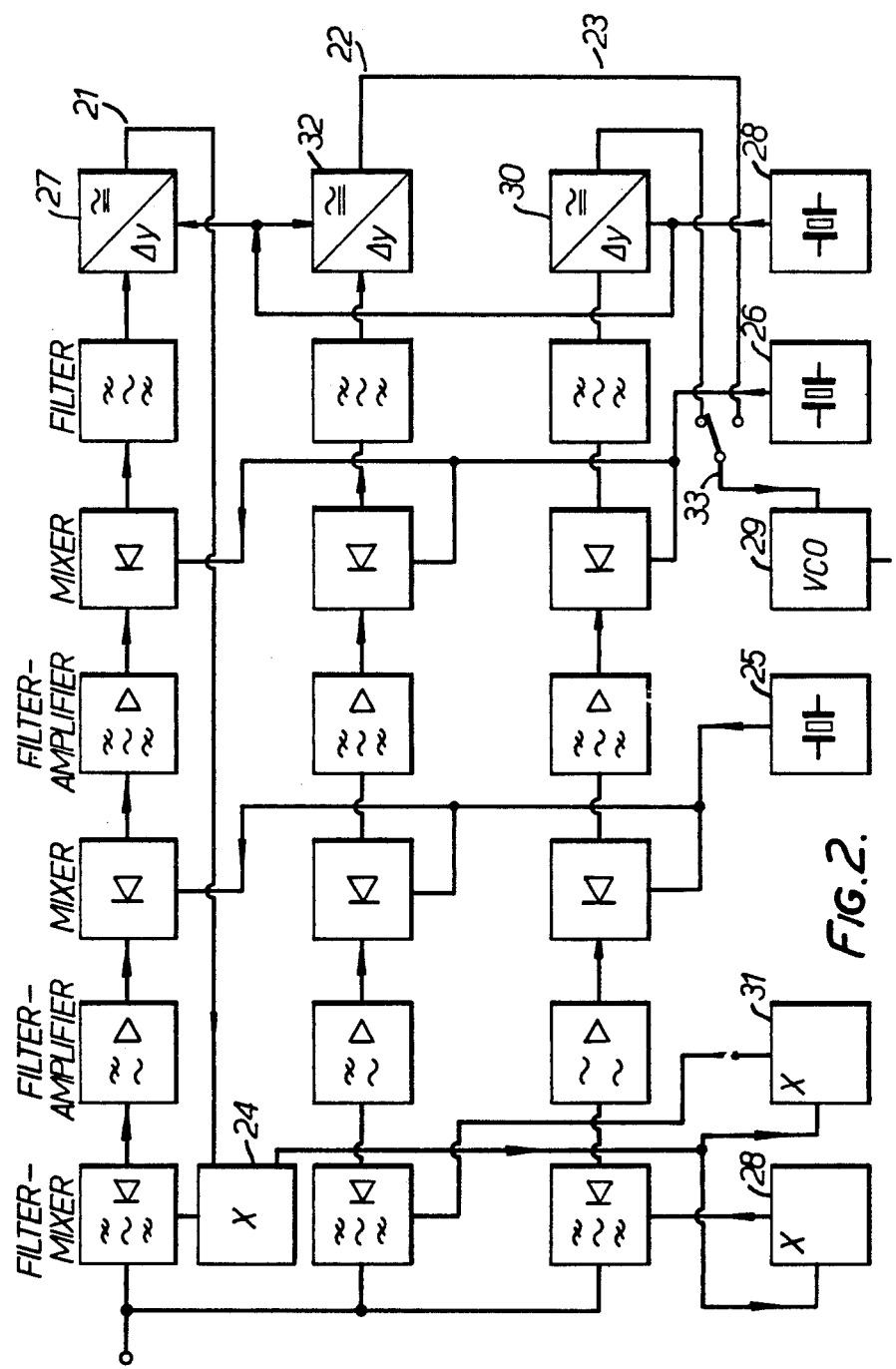

The invention is further described, by way of example, with reference to the accompanying drawings in which, FIG. 1 shows in diagrammatic form a satellite communications system illustrating the signal paths between a master ground station, a satellite and a slave ground station, and FIG. 2 shows details of the slave ground station.

Referring to FIG. 1, a satellite 1 provides communication channels between a reference ground station 2 and a slave ground station 3. In practice, many ground stations would exist and one master station would be designated the reference ground station '0' and the remainder would be designated slave ground stations '1' to 'n'.

The station 2 contains a stable reference frequency generator, shown as the reference pilot generator 4 which sends the reference for the reference pilot via an automatic frequency control circuit 6 and an up-converter 7 to the satellite 1. It is returned by the satellite and received by the a.f.c. circuit 6 via a down converter 7.

In the reference station 2 the down-converted pilot frequency is compared with the reference pilot frequency in the a.f.c. circuit 6, which shifts the up-conversion to such a degree so that the down converted frequency is equal to the frequency from the reference pilot generator.

The reference pilot frequency is also received via a down-converter 8 by the ground station 3. The ground station 3 is also able to transmit a pilot signal to the satellite 1 via an up-converter 9.

The various errors encountered in the signal loop between the reference ground station and the satellite are summarised as follows:

| | |
|---|---|
| $F_r + \Delta f_r$ | Reference pilot frequency and generator error |
| $+ (\Delta f_{AFC})_R$ | frequency noise of the AFC at the reference station |
| $+ (\Delta f_{UC})_R$ | frequency error of up-converter at the reference station |
| $+ (\Delta f_{UL})$ | up-path Doppler shift |
| $+ 70 (\Delta f_{SAT})$ | frequency translation error in the satellite |
| $+ (\Delta f_{DL})_R$ | down-path Doppler shift to reference station |
| $+ (\Delta f_{DC})_R$ | down-converter frequency error at the reference station |

When the reference control loop is closed the frequency at point (R) is $$F_R = F_r + \Delta f_r - (\Delta f_{AFC})_R$$

The frequency at point (S), the satellite output, is $$(F_r)_S = F_R - (\Delta f_{DC})_R - (\Delta f_{DL})_R$$

The frequency at point (1,r), reference frequency at ground station '1', is $$(F_r)_1 = (F_r)_S + (\Delta f_{DL})_1 + (\Delta f_{DC})_1$$

At this point ground station '1' derives its pilot by translation with the aid of the reference generator for the pilot offset frequency so that the pilot frequency for station '1' becomes $$(F_1)_1 = (F_r)_1 + F_{01} + \Delta f_{01}$$

This pilot 1 is treated by the AFC loop in ground station '1' in the same manner as the reference pilot by the AFC loop in the reference station.

Consequently the pilot frequency 1 for ground station '1' when seen at the point (S) will be $$(F_1)_S = (F_1)_1 - (\Delta f_{AFC})_1 - (\Delta f_{DC})_1 - (\Delta f_{DL})_1$$

The pilot frequency spacing at the satellite output point (S) will be $$(F_1)_S - (F_r)_S = F_{01} + \Delta f_{01} - (\Delta f_{AFC})_1$$

This brief characterisation of the frequency control loops makes no allowance for changes of the Doppler frequency during twice the delay of up and down transmission. This being about 0.5 second makes the resulting error negligible.

The pilot frequency spacing has two errors as shown. They are $\Delta f_{01}$ the frequency error of the offset frequency generator, and $(\Delta f_{AFC})_1$ the phase (frequency) noise originating from the AFC at ground station '1'.

The absolute frequency positions for the two pilots are:

(a) at point S $$(F_r)_S = F_R - (\Delta f_{DC})_R - (\Delta f_{DL})_R$$

$$(F_1)_S = F_R - (\Delta f_{DC})_R - (\Delta f_{DL})_R + F_{01} + \Delta f_{01} - (\Delta f_{AFC})_1$$

(b) at point R $$(F_r)_R = F_R$$

$$(F_1)_R = F_R = F_{01} + f_{01} - (\Delta f_{AFC})_1$$

in both cases $$F_R = F_r + \Delta f_r - (\Delta f_{AFC})_R$$

This means that pilot analysis at the master station only has to cope with the following frequency errors $\Delta f_r$ error of reference pilot generator $\Delta f_{On}$ error of pilot offset frequency generator of station n $(\Delta f_{AFC})_1$ frequency noise of reference station AFC circuit $(\Delta f_{AFC})_n$ frequency noise of station n AFC circuit The pilot spacing error is very small as shown above by $(F_1)_S - (F_r)_S$. At point (1,1) the absolute frequency position of the reference pilot is given by $(F_r)_1$ and of the station pilot by $(F_1)_{1,1}$ as follows, $$(F_r)_1 = F_r + \Delta f_r - (\Delta f_{AFC})_r - (\Delta f_{DC})_R - (\Delta f_{DL})_R + (\Delta f_{DL})_1 + (\Delta f_{DC})_1$$

$$(F_1)_{1,1} = (F_r)_1 + F_{01} + \Delta f_{01} - (\Delta f_{AFC})_{1,1}$$

Important for frequency control is the difference $$(F_1)_{1,2} - (F_1)_{1,1} = -(\Delta f_{DC})_1 - (\Delta f_{DL})_1 - (\Delta f_{sat})_1 - (\Delta f_{UL})_1 - (\Delta f_{UC})_1$$

This frequency difference across the AFC before control is switched on at ground station '1' can be fairly large, the greatest contribution being the satellite translation error, and the Doppler shift on both paths together. This difference is measured before a ground station goes on the air for traffic or even before it switches on its own pilot. Each station measures this translation error together with the next largest error which is the up-link Doppler shift for its own position.

In this system the ground stations receive the reference pilot signal, and then transmit their unmodulated carrier signal one by one in a specially assigned communication channel which is wide enough to accommodate any errors. After searching for its own carrier on the return transmission from the satellite, and noting the frequency difference between a calculated offset from the reference pilot frequency and the actual measured offset frequency, a frequency lock can be established, so that when the ground station commences communication transmission in a proper communications channel the used carrier frequency is fairly accurately positioned. When the ground station pilot signal is switched on it can be quickly locked onto the reference pilot frequency by using a phase lock loop or a device for achieving frequency lock to pull in any remaining frequency difference, which will be very small. When locked onto the reference pilot frequency the pilot frequency for each ground station will usually be positioned a different multiple of a pilot frequency space away from the reference pilot frequency value.

The control arrangement shown in FIG. 2 illustrates how the following three functions are carried out by the ground station receiver.

(a) Receive the reference pilot and locking the receiver LO's to the reference pilot.

(b) Receive its own unmodulated ground station carrier and provide the correct up-translation frequency for pulling this ground station carrier into its correct frequency position with respect to the reference pilot.

(c) Receive its own ground station pilot and frequency-lock its position to the correct spacing from the reference pilot.

These functions require at least two but preferably three frequency lock loops and these are referenced 21, 22 and 23 in FIG. 2. The loop 21 provides locking for the received reference pilot, the loop 22 locks the received ground station pilot, and loop 23 locks the received ground station channel. The operation of FIG. 2 is described with reference to typical frequencies.

Within loop 21 the first local oscillator 24 is tuned, for example to $X = 58050$ kHz to produce a second IF of 10.7 MHz from 68.75 MHz. With a crystal controlled second local oscillator 25, the frequency is transformed by 9.7 MHz to 1 MHz and by a third crystal controlled oscillator to the final IF of 100 kHz. A phase detector 27 at this point compares the received frequency after down-conversion to 100 kHz with a 100 kHz crystal standard 281. The output of the phase detector is used as AFC control voltage for the first local oscillator 24. The latter is thus controlled by the reference pilot, and can be used as a reference local oscillator for the other signals to be received, i.e. unmodulated ground station carrier and unmodulated ground station pilot. This top channel 21 is, therefore, called the reference pilot frequency lock channel.

The other two channels are provided for the frequency lock of the ground station pilot and the ground station carrier.

The third chain 23 is used to receive the unmodulated channel carrier. The first local oscillator 28 is set for the correct channel centre frequency by using the reference pilot local oscillator frequency X and adding the required frequency difference Y between reference pilot and that channel centre frequency. The second local oscillator 25 with a fixed 9700 kHz converts the received signal to about 1 MHz. At this point the satellite translation error has not been cancelled out. Consequently, a 900 kHz local oscillator 29 must be tuned until the phase detector or a frequency detector 30 at the 100 kHz end of this bottom chain picks up the carrier in its pull-in range. Then the 900 kHz oscillator 29 can be frequency locked. Now the up-conversion for the ground station carrier derives its up-conversion from oscillator 29 and from this and the control loop 23 the unmodulated ground station channel carrier is in the correct frequency position. A phase discriminator combination 30 or an accurate frequency discriminator can be used to produce an AFC voltage for holding the transmitted carrier in that position.

Having positioned the unmodulated ground station channel frequency at the designated frequency the associated pilot can be found by adding the frequency difference between reference pilot and designated ground station pilot (for example $Z = n \times 1.5$ kHz) from oscillator and adder 31. There will be a phase difference indicated by the phase detector 32 at the end of the second chain for two reasons:

the frequency difference between ground station carrier and ground station pilot is not absolutely correct the Doppler shift for pilot and channel from the same station is different.

For this reason the station pilot control detector chain 22 is provided with a feedback loop similar to that in the channel frequency detector chain. Changing switch 33 over from loop 23 to loop 22 will give the discriminator 32 such a small final correction to carry out that danger of lock failure is extremely small for most known pilot/channel frequency differences in satellite communication.

I claim:

1. A satellite communications system including two or more ground stations arranged to communicate via a satellite, one ground station including means for generating and transmitting a reference pilot signal having a stable reference frequency which is received via the satellite by another ground station, means located at said another ground station for transmitting in a part of the communication band of the system not being used as a communication channel an auxiliary pilot frequency which is received and returned by the satellite to enable Doppler frequency shifts to be detected, and means for generating and transmitting in a designated communication channel reserved for pilots a pilot frequency compensated for the detected Doppler frequency shift so that upon reception at the satellite the pilot frequency is spaced apart in frequency from the reference frequency by a predetermined amount.

2. A satellite communications system as claimed in claim 1 and wherein frequency translation errors in the loop between the ground station which emits the reference pilot and the satellite are also measured so that when the pilot signal is actually transmitted in a communication channel it is accurately positioned so as not to interfere with adjacent communication channels.

3. A satellite communications system as claimed in claim 1 and wherein means are provided for fine tuning the transmitted pilot signal to achieve the final degree of accuracy required.

4. A satellite communications systems comprising, in combination:
a reference ground station including means for generating and transmitting a reference pilot signal having a stable reference frequency; and
at least one further ground station adapted to receive said reference pilot signal via satellite, said further ground station including first down converter channel means for receiving said reference pilot signal via the satellite and converting it downwardly to a fixed intermediate frequency, said first down converter channel means including a local oscillator and means for controlling said local oscillator to provide an output frequency which produces said fixed intermediate frequency, said further ground station also including means, having a second local oscillator, for generating and transmitting a carrier signal which is returned by the satellite and second down converter channel means for receiving said returned carrier signal and converting it downwardly toward said fixed intermediate frequency; said second down converter channel means including a third local oscillator connected with the first mentioned local oscillator to produce approximately said fixed intermediate frequency in said second down converter channel means, a stable frequency oscillator having an output which is at said fixed intermediate frequency, and automatic frequency control means receiving the outputs of said stable frequency oscillator and said second down converter channel means for controlling said second local oscillator such that the reference pilot frequency and said carrier signal appearing at the output of the satellite are spaced apart in frequency by a predetermined amount.

5. A satellite communication system as defined in claim 4 wherein said further ground station also includes means for generating and transmitting a second pilot signal and third down converter channel means for receiving said second pilot signal via the satellite and converting it downwardly toward said fixed intermediate frequency, said third channel means including a fourth local oscillator connected to the first mentioned local oscillator to produce approximately said fixed intermediate frequency in said third channel means, a second stable frequency oscillator, and automatic frequency control means receiving the outputs of said second stable frequency and said third channel means for controlling said second local oscillator.

6. A satellite communications system including two or more ground stations arranged to communicate via a satellite, one ground station including means for generating and transmitting a reference pilot signal having a stable reference frequency which is received via the satellite by another ground station, means located at said another ground station for transmitting in a part of the communication band of the system not being used as a communication channel an auxiliary pilot frequency which is received and returned by the satellite to enable Doppler frequency shifts to be detected, said another ground station also including means for measuring said Doppler frequency shifts and means responsive to such measurement for subsequently generating and transmitting in a designated communication channel reserved for pilots a corrected pilot frequency signal compensated for the measured Doppler frequency shift by an amount such that the reference pilot signal and the corrected pilot frequency signal appearing at the output of the satellite are spaced apart in frequency by a predetermined amount.

7. A satellite communications system comprising, in combination:
a reference ground station including means for generating and transmitting a reference pilot signal having a stable reference frequency; and
at least one further ground station adapted to receive said reference pilot signal via satellite, said further ground station including means for transmitting in a part of the communication band of the system not being used as a communication channel an auxiliary frequency signal which is received and returned by the satellite, first down converter channel means for locking onto said reference pilot signal as received from the satellite, second down converter channel means controlled by said first down converter channel means for locking onto said auxiliary frequency signal as returned by the satellite, and up converter means controlled by said second down converter channel means for transmitting a second pilot signal which, as received and transmitted by the satellite, is spaced apart in frequency from said reference pilot signal, as received and transmitted by the satellite, by a predetermined amount.

* * * * *